June 9, 1953 — C. M. WOLFE ET AL — 2,641,742
PRESSURE PICKUP
Filed Sept. 20, 1948 — 2 Sheets-Sheet 1
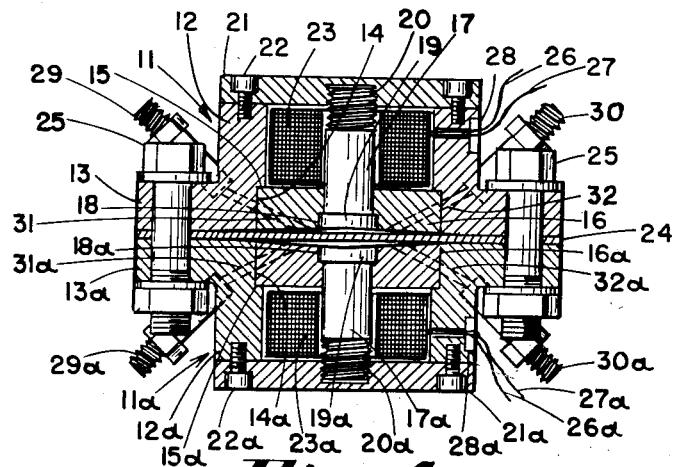
Fig. 1
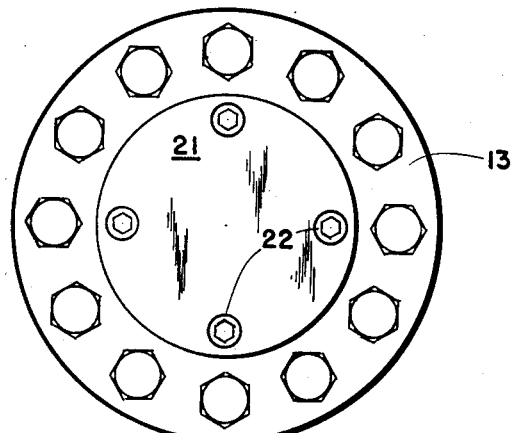
Fig. 2
Fig. 3
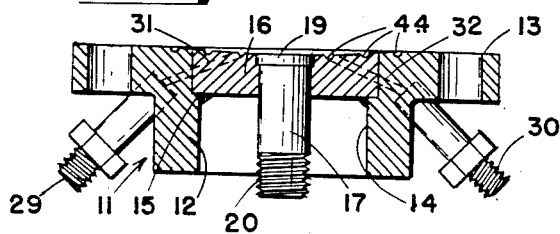
INVENTORS.
CHARLES M. WOLFE
JOHN E. MILLER
BY
D. Gordon Angus
ATTORNEY June 9, 1953     C. M. WOLFE ET AL     2,641,742
PRESSURE PICKUP Filed Sept. 20, 1948     2 Sheets-Sheet 2

INVENTORS.
CHARLES M. WOLFE
JOHN E. MILLER
BY
D. Gordon Angus
ATTORNEY

Patented June 9, 1953

2,641,742

UNITED STATES PATENT OFFICE 2,641,742

PRESSURE PICKUP

Charles M. Wolfe, Glendora, and John E. Miller, Altadena, Calif., assignors, by mesne assignments, to Aerojet-General Corporation, Cincinnati, Ohio, a corporation of Ohio Application September 20, 1948, Serial No. 50,048

8 Claims. (Cl. 336—30)

This invention relates to electrical pressure detecting systems and more particularly to devices of this character which are capable of measuring differential pressures.

The principal object of the invention is to provide a pressure detecting or pickup device of this character which is compact, simple, rugged and capable of use with corrosive fluids or gases.

A related object is to provide a device of this character which is extremely sensitive even to relatively small pressures, and operative over a wide range of pressures.

A further related object is to provide a device of this character capable of use with simple recording equipment and without the need for elaborate auxiliary equipment.

We carry out our invention by provision of a pair of oppositely disposed housing members arranged to abut each other and with a sensitive diaphragm held therebetween, providing a space for diaphragm movement in both directions. The diaphragm forms part of the magnetic circuit of both sections; and a coil is mounted on a core of each section so that the voltage across each coil will be varied by variation of the air gap formed with diaphragm in each section.

According to a feature of the arrangement, provision is made for introducing fluid or gas whose pressure is to be measured to one or both sides of the diaphragm.

A further feature resides in the provision of elements for constraining the diaphragm against rupture.

The foregoing and other features of our invention will be better understood from the following description and accompanying drawings of which:

Fig. 1 shows a cross-sectional view of the pressure responsive device suitable for measuring differential pressures;

Fig. 2 is a top plan view of the device;

Fig. 3 is a cross-section view showing the stop elements;

Figure 4:
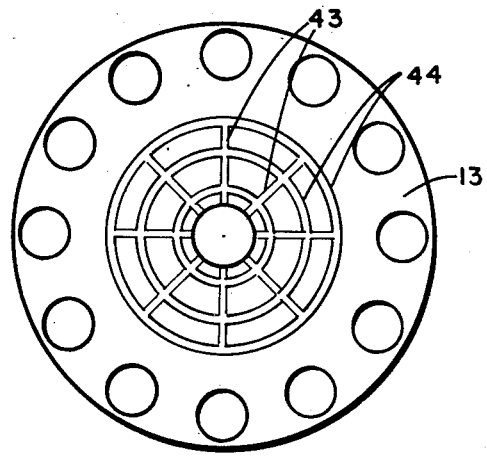
Fig. 4 is a plan view of the stop element with the diaphragm removed.

Referring to the drawings, the pickup comprises a pair of caps 11 and 11a, each comprising a cylindrical portion 12 and 12a respectively, the cylindrical portions terminating in abutting annular flanges 13 and 13a, respectively. The caps are counterbored at 14 and 14a respectively, forming respective shoulders 15 and 15a. Within each counterbore there is fitted an annular disc, these being numbered 16 and 16a, respectively; and in order to accommodate plugs or cores 17 and 17a, the discs 16 and 16a are counterbored at 18 and 18a, respectively so that the heads 19 and 19a of the respective plugs 17 and 17a will fit the counterbore. The outer ends of the two plugs 17 and 17a are threaded at 20 and 20a respectively, and these threaded ends extend beyond the outer ends of caps 11 and 11a so as to thread into respective cover plates 21 and 21a, which are bolted to the ends of the respective cylinders 12 and 12a by bolts or preferably recessed head screws 22 and 22a. Within the annular space around each of the plugs 20 and 20a there is provided a coil of wire, these coils being numbered 23 and 23a respectively.

The two caps, assembled with their coils as thus described are then placed together with their flanges abutting each other and holding between them the periphery of a circular diaphragm 24, bolts 25 being used for the clamping around the periphery of the flanges. The caps, plugs and cover plates are of a magnetic material preferably magnetic stainless steel and the diaphragm likewise is of a magnetic metal, such as magnetic stainless steel or Swedish spring steel. By reason of this construction there is formed a magnetic circuit through each cap, the cover plate, the plug and the diaphragm with only a small air gap between the center of the diaphragm and the head of the plug. The discs 16 and 16a are formed of a non-magnetic material so that they do not form part of the magnetic path; they may be of a non-magnetic metal, and preferably are of non-magnetic stainless steel.

The inner surfaces of annular discs 16 and 16a, which face each other, are dished somewhat so that toward the center there is a greater space than at their peripheries. This dishing or depression allows room for the diaphragm to vibrate in before striking the members 16 and 16a; said members 16 and 16a act as stops for the diaphragm and seal the fluid medium from the coils.

Preferably the core, the main block and the outside rim or cap and annular disc of each portion of the pickup are welded or silver-soldered and welding is usually preferred to silver-soldering, in order better to resist corrosion in the case of use with corrosive gases or liquids. The surface which fits against the diaphragm is preferably machined to provide a close fit capable of forming a fluid tight seal when assembled. The shape of the relief or dishing of the opposed faces of discs 16 and 16a is preferably not spherical; but rather it is preferred to shape the dishing curvature from formulae for diaphragm deflection so that when subject to relatively high pressure differentials, the diaphragm will be forced against one or the other of the dished surfaces and will contact the dished portion over substantially its entire area.

Experience indicates, however, that the amount of relief from a flat planed surface should not be less than about .0001 inch regardless of the calculated diaphragm deflection. The amount of deflection is closely related to the effective diameter of the diaphragm and is also determined by the allowable stress of the diaphragm material. In a preferred arrangement, the thickness of the diaphragm is selected so that full scale differential pressure produces a maximum diaphragm deflection in the neighborhood of about .004 inch; and accordingly, it is preferred that the amount of dishing shall accommodate this amount of deflection.

A number of radial grooves 43 are formed in the faces of discs 16 and 16a, which are adjacent to the diaphragm; and also a number of concentric circular grooves 44 are formed in these same faces. These grooves need not be wide and are preferably shallow, being only deep and wide enough to convey the pressure within the space between the diaphragm and the respective disc, to all parts of the space and to act as a trap for small particles of dirt in the fluid whose pressure is being measured. Ordinarily a fine screen will be used in the fluid connecting lines to keep any substantial amount of dirt out of the device.

The leads 26 and 27 for coil 23 are brought in through a grommet opening 28 in the side wall of cylindrical portion 11; and similarly the terminal leads 26a and 27a for coil 23a are brought in through grommet opening 28a.

Each of the caps is provided with inlet and outlet openings for leading fluid to the space between the diaphragm and the discs 16 and 16a. Thus, member 11 is provided with inlet and outlet connections or fittings 29 and 30, which communicate with respective fluid passageways 31 and 32, which lead to the space above the diaphragm. Similarly, fittings 29a and 30a in member 11a lead to fluid conduits 31a and 32a respectively which communicate with the space at the underside of the diaphragm. Through these orifices fluid may be introduced to either or both sides of the diaphragm, and when one of the fittings on a side of the diaphragm is used as an inlet for the fluid or gas, the other fitting on the same side may be used as an outlet or vent. The fluid or gas may be caused to run through the spaces on opposite sides of the diaphragm, if desired when venting. The term "fluid" as used in this specification and claims covers either liquid or gas. The fluid-tight fitting of the plug heads to the disc elements 16 and 16a, and the welded joints of the latter into their respective counterbores in the caps prevents leakage of the fluid into the spaces occupied by the coils, and thus protect the coils from damage.

When used to measure differential pressure which may, for example, develop across an orifice plate such as those employed for liquid or gaseous flow measurements, one line or conduit would connect one side of the orifice plate to fitting 29 and another line from the other side of the orifice plate would connect to fitting 29a. In this case 30 and 30a would be closed with a cap, preferably after bleeding the system, to remove any unwanted gases or liquids.

For making direct pressure measurements of a system under pressure fittings 29 and 30 may be left open to the atmosphere and a single conduit will be used to connect the system to fitting 29a of the pickup. Fitting 30a is closed or capped after bleeding, as indicated above. The above are merely given as examples of the numerous methods in which the device may be employed, and it is obvious the device will be suitable for other applications by merely making proper connections.

Figure 5:
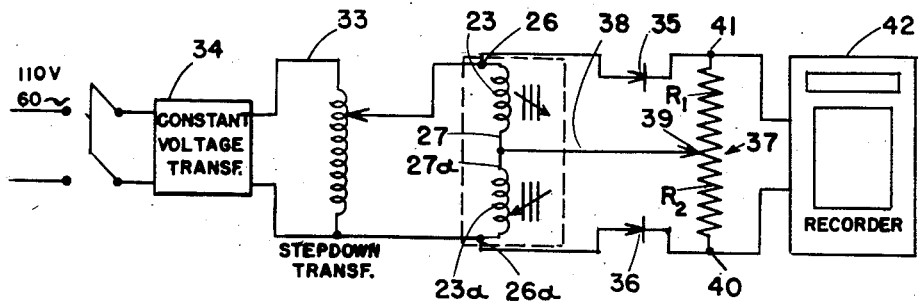
Fig. 5 is a schematic representation of the circuit including the pickup.

Fig. 5 is a schematic wiring diagram showing the system in which the pickup can be energized from an ordinary commercial power line. The power voltage, which may be assumed to be an ordinary 110 volt, 60 cycle line, is applied across the series-connected pickup coils 23 and 23a. Ordinarily the pickup coils will be wound to operate on a much smaller voltage than 110 volts and in such case the voltage from the power supply should be stepped down before application to the pickup coils. In Fig. 5 a step-down transformer 33 is used for this purpose. Preferably, the power supply is applied through a constant voltage transformer 34 in order to maintain the excitation voltage constant. The voltage across the series-connected pickup coils is applied through rectifiers 35 and 36, which may be of the crystal or dry-plate type, such as germanium, copper oxide, selenium, or also of the vacuum tube type and across a potentiometer 37. The lead 38 from the midpoint between coils 23 and 23a is connected to the runner 39 of potentiometer rheostat 37; and since the two rectifiers have their forward conductivities in the same direction, current will flow in opposite directions through the parts of the potentiometer which are on opposite sides of the connection 39. The output from the potentiometer is taken from lower connecting tap 40 and the upper tap 41 which are connected across a suitable recording device 42, such as a chart recorder.

Adjustment of the runner 39 of the potentiometer without pressure on the pickup unit can be made to set the recording indicator at a zero reading or such other reading as may be selected for zero pressure. Then in the event of pressures applied by liquids or gases admitted to the two sides of the diaphragm, the diaphragm will move one way or the other depending on the pressure differential. This will change the air gaps and correspondingly change the reluctances of the two magnetic circuits defined by the two caps so that there will be a differential voltage in one direction or the other between the parts of the potentiometer which are on opposite sides of the runner 39; and this will produce a corresponding deflection of the indicator 42; and the direction of the deflection will show the side of the greatest pressure.

Figure 6:
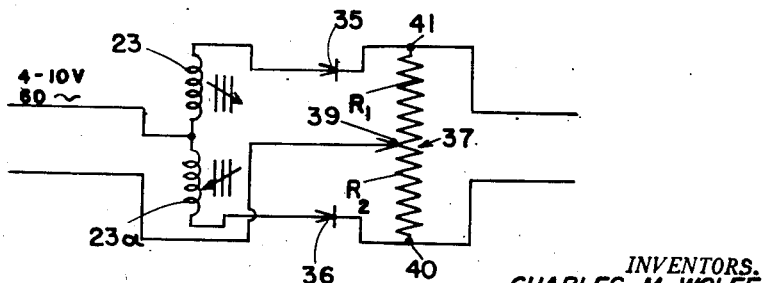
Fig. 6 is an alternative circuit which may be used in conjunction with the pickup.

A possible variation of the electrical system is indicated in Fig. 6 which shows the pickup coils in a bridge arrangement. Here the power line, preferably after passage through a constant voltage transformer and a step down transformer, is connected from a mid-point between the pickup coils and the runner 39 of the potentiometer rheostat 37.

Although considerable variation is permissible in the choice of elements of the circuit, the following are indicated as giving good results although it should be understood that these values are given by way of example rather than of limitation.

Coils 23 and 23a_____ 200 millihenries, each
Potentiometer rheostat 37_____ 2000 ohms
Rectifiers 35 and 36_. Germanium, such as IN34 made by Sylvania Manufacturing Corp.

Resistors should be wound of low temperature coefficient conducting material to minimize the effect of temperature changes.

It will be recognized that our novel construction possesses many advantages. By reason of the isolation of the coils from the gap around the diaphragm, and the sealing of this gap, the coils are protected from the liquid or gases whose pressures are being measured. The diaphragm itself is protected from rupture due to excessive pressure by reason of the position and shaping of the dished non-magnetic discs 16 and 16a, which act as stops and support the diaphragm from further deflection. By reason of this arrangement, the diaphragm can be made exceptionally thin, and therefore responsive to very slight pressures. Full scale differential pressures as low as one ounce per square inch have been measured and the range may be extended from this extremely low pressure differential to as much as 2,000, 5,000 or even 10,000 pounds per square inch for full scale deflection. Differential pressure can equal the line pressure without damage to either diaphragm or to other parts of the pickup and without disturbing calibration.

A major advantage resides in the fact that the device can easily be taken apart, cleaned thoroughly and used on diverse fluids or gases; and by reason of its resistance to corrosion, it may be used with liquids or gases which are normally very corrosive.

An advantage of operation is that it may be used in systems without auxiliary amplifiers or oscillators inasmuch as it can be operated from an ordinary 60-cycle power line and directly into conventional industrial recorders.

The particular electrical systems indicated in Figs. 5 and 6, are D. C. systems, in which the indicator will indicate steady or at least momentary pressure differentials. The principal application for the device will probably be for ordinary low frequency type of variation of industrial pressure and/or flow measurements. It should be understood that while pressure frequencies could be measured if desired, for example up to about 10 cycles per second, for higher frequency recording, a carrier frequency, for example of around 1,000 cycles per second might be used for energizing the coils.

We claim:

1. A pressure pickup device comprising a pair of oppositely disposed housings, each of said housings having a peripheral surface, said surfaces being plane and facing each other, a diaphragm having its peripheral portion secured between said plane facing surfaces, the housings and diaphragm being of magnetic material, each of said housings having a core of magnetic material forming with the housing a magnetic path, each core having its longitudinal axis extending substantially perpendicular to the diaphragm and leaving a gap between the core and the diaphragm, a coil around each core, and a non-magnetic annular element at the end of each housing adjacent the diaphragm and lying between the core and the periphery of the housing and providing fluid-tight junction with the core and the housing, each of said annular elements being dished to provide relief from the diaphragm and acting as diaphragm stops, and a fluid conduit means leading from outside the device into the space at each side of the diaphragm, whereby the diaphragm deflects in accordance with the difference of pressure on the two sides of the diaphragm.

2. A pickup according to claim 1 in which the dished portion of the annular element is provided with radial and concentric grooves.

3. A pickup according to claim 1 in which the outline of the dished portion conforms approximately to the outline of the diaphragm when deflected.

4. A pickup according to claim 1 in which the peripheral surfaces of the housing form a fluid tight seal.

5. A pressure pickup device comprising a pair of oppositely disposed housings, each of said housings comprising a cylindrical portion, with a cap covering one end of the cylinder and a flange at the other end of the cylinder and a concentrically located core within the cylinder making connection with the cap, a diaphragm having its peripheral portion secured between the abutting surfaces of the flanges of the two housings, so that the ends of the cores are juxtaposed with respect to each other, leaving a gap between each core and its respective side of the diaphragm, the cores, caps, cylindrical portions and diaphragm being of magnetic material, an annular disc of non-magnetic material making a fluid tight connection between the end of each core and the end of the cylindrical portion nearest the diaphragm, fluid entrance and vent conduit means leading from the outside of the device to the space at each side of the diaphragm, and a coil wound around each core in the space within each housing and protected from the fluid by said discs, each of said discs being dished toward the center to provide movement for the diaphragm while acting as a diaphragm stop.

6. A pressure pickup device comprising a pair of oppositely disposed housings, each of said housings having a peripheral surface, said surfaces facing each other, a diaphragm having its peripheral portion secured between said facing surfaces, the housings and diaphragm being of magnetic material, each of said housings having a core of magnetic material forming with the housing a magnetic path, each core having its longitudinal axis extending substantially perpendicular to the diaphragm and leaving a fluid-tight space between the core and the diaphragm, and a non-magnetic annular element at the end of each housing adjacent the diaphragm and lying between the core and the periphery of the housing and providing fluid-tight junction with the core and housing, each of said annular elements being dished to provide relief from the diaphragm and acting as diaphragm stops, and a fluid entrance conduit and a fluid vent conduit leading from outside the device to the space at each side of the diaphragm.

7. A pressure pickup device comprising a housing means, a diaphragm located transversely across the interior of the housing means and having its peripheral portion secured to the housing means, a pair of cores secured to the housing means at either side of the diaphragm and extending substantially perpendicular to the diaphragm and leaving a space between each core and the diaphragm, said diaphragm completely separating the two spaces, the housing means, the cores and the diaphragm being of magnetic material, thereby providing a magnetic path through the diaphragm, the housing means and each core, a coil around each core, a fluid-tight non-magnetic plug means around the end of each core and within the housing means, each of said plugs being relieved from the diaphragm thereby allowing the diaphragm vibratory motion between the two plugs, and a fluid entrance conduit leading from outside the device to the space at each side of the diaphragm.

8. A pressure pick-up device according to claim 7 in which there is an additional fluid conduit leading from outside the device to the space at each side of the diaphragm.

CHARLES M. WOLFE.
JOHN E. MILLER.

References Cited in the file of this patent

UNITED STATES PATENTS

| Number | Name | Date |
|---|---|---|
| 1,718,494 | Schurig | June 25, 1929 |
| 2,376,156 | Kuehni | May 15, 1945 |
| 2,403,535 | Kremer | July 9, 1946 |
| 2,430,757 | Conrad et al. | Nov. 11, 1947 |
| 2,440,605 | Hathaway | Apr. 27, 1948 |
| 2,494,621 | Jones | Jan. 17, 1950 |
| 2,509,210 | Clark | May 30, 1950 |